United States Patent [19]

Mitamura et al.

[11] Patent Number: 4,721,437
[45] Date of Patent: Jan. 26, 1988

[54] ANIMATED ANNUNCIATOR APPARATUS

[75] Inventors: Isao Mitamura; Hitoshi Otaka, both of Tokyo, Japan

[73] Assignee: Tomy Kogyo Co., Inc., Tokyo, Japan

[21] Appl. No.: 947,885

[22] Filed: Dec. 30, 1986

[30] Foreign Application Priority Data

Jan. 22, 1986 [JP] Japan .................................. 61-11722

[51] Int. Cl.[4] .......................................... H04M 1/02
[52] U.S. Cl. ................................... 379/388; 379/434; 40/457; 446/301
[58] Field of Search ............... 379/373, 374, 388, 387, 379/389, 390, 420, 434, 53, 419, 432, 436; 446/301, 175, 299, 300; 40/457, 416, 455, 902, 463

[56] References Cited

U.S. PATENT DOCUMENTS

| H118 | 9/1986 | Biggs et al. | 379/88 |
|---|---|---|---|
| 2,324,774 | 7/1943 | Henry. | |
| 2,953,869 | 9/1960 | Collischan. | |
| 3,277,594 | 10/1966 | Rogers et al. | 40/457 |
| 3,364,618 | 1/1968 | Ryan et al. | 446/301 X |
| 3,469,039 | 9/1969 | Lee | 446/301 X |
| 3,662,374 | 5/1972 | Harrison, II | 446/301 X |
| 4,139,968 | 2/1979 | Milner | 446/301 |
| 4,177,589 | 12/1979 | Villa | 40/457 |
| 4,207,704 | 6/1980 | Akiyama | 446/301 |
| 4,560,833 | 12/1985 | Weber et al. | 379/53 |
| 4,665,640 | 5/1987 | Forsse et al. | 40/457 |

FOREIGN PATENT DOCUMENTS

| 492633 | 3/1930 | Fed. Rep. of Germany. | |
| 2304613 | 8/1973 | Fed. Rep. of Germany | 446/301 |
| 701036 | 12/1953 | United Kingdom. | |
| 965916 | 8/1964 | United Kingdom. | |
| 1260142 | 1/1972 | United Kingdom. | |
| 2008419 | 6/1979 | United Kingdom. | |

OTHER PUBLICATIONS

"Beardroid Phone", DAK Industries Inc., received Apr. 29, 1987.
"Understanding Telephone Electronics", John Fike et al., Radio Shack, 1983, pp. 2-1 to 2-17.

Primary Examiner—Jin F. Ng
Assistant Examiner—R. Vaas
Attorney, Agent, or Firm—Staas & Halsey

[57] ABSTRACT

An animated telephone annunicator apparatus provides realistic movements so that a user of the apparatus appears to converse with the apparatus. The apparatus receives telephone signals, and in response to these received signals moves portions of the apparatus in synchronism with the signals. As a result, the apparatus appears to realistically speak the words of a calling party.

4 Claims, 5 Drawing Figures

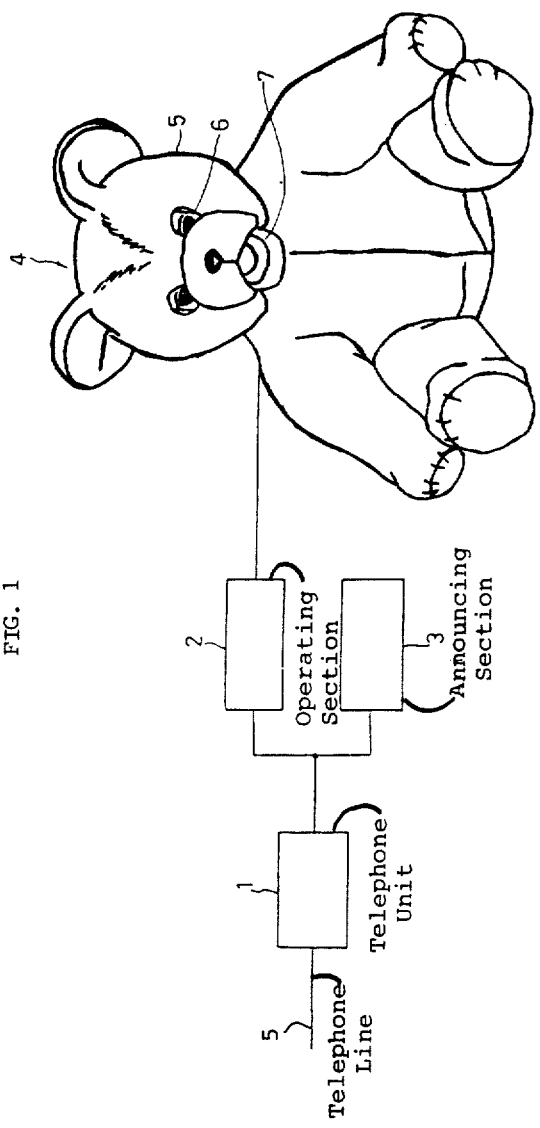
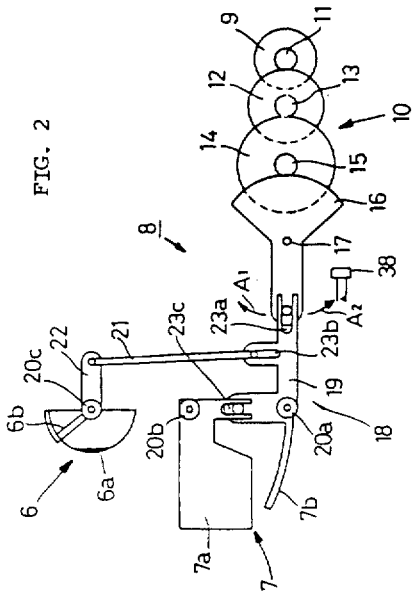

ANIMATED ANNUNCIATOR APPARATUS

BACKGROUND OF THE INVENTION

The present invention relates to an annunciator apparatus which is to an animated telephone apparatus wherein a movable object moves in synchronism with the conversation of one party to a telephone conversation.

Typically, telephone annunciator apparatus record a telephone communication (i.e., the speech of a calling party) on one channel of a recording tape, together with control signals on another channel of the tape recording tape. Subsequently, the tape recording tape is played back and a movable object is moved in response to the control signals and the voice signals recorded on the tape recording tape. The structure of such an apparatus is, however, complicated and it is impossible to move the movable object in synchronism with the speech of the calling party. As a result, the movable object does not realistically simulate conversation between the calling party and a user of the apparatus.

SUMMARY OF THE INVENTION

It is an object of the present invention to provide a telephone apparatus wherein a telephone conversation appears to be taking place with a movable object which moves in synchronism with the speech of a calling party.

It is a further object of the present invention to provide a simple and inexpensive telephone apparatus wherein a user appears to converse with a movable object which moves in synchronism with the speech of a calling party.

To achieve the above and other objects, the present invention includes a telephonic means for transmitting and receiving telephone signals; an announcing means for receiving at least a first one of said telephone signals and for generating a voice control signal varying in accordance with the at least one of the telephone signals; and an animation means, having movable elements, for receiving the voice control signal, and for moving the movable element in synchronism with the voiced control signal.

In a preferred embodiment of the present invention, the telephonic means comprises a circuit for receiving telephone signals (e.g., on hook, off hook and speech signals) and placing the apparatus in an active state so as to enable a calling party to converse with a user of the apparatus, and a circuit for transmitting dial signals to enable a user of the apparatus to place a call to another person; the announcing means includes a circuit for enabling a user of the apparatus to place the apparatus in an active state so as to receive and convert speech signals of a calling party into sound. In a preferred embodiment of the present invention the animation means includes an amplifier for generating a motion signal which varies in synchronism with the speech of a calling party, a motor rotating in response to the motion signal, a gear train mechanism which rotates in response to movement of the motor, and linkage elements movably connected to the gear train mechanism so as to selectively move the movable elements in a first direction and in a second direction in accordance with and in synchronism with the speech of the calling party.

BRIEF DESCRIPTION OF THE DRAWINGS

FIG. 1 is a schematic diagram of a system embodying the present invention;

FIG. 2 illustrates the details of a gear train mechanism employed in the present invention;

DETAILED DESCRIPTION OF THE PREFERRED EMBODIMENT

Figure 3:
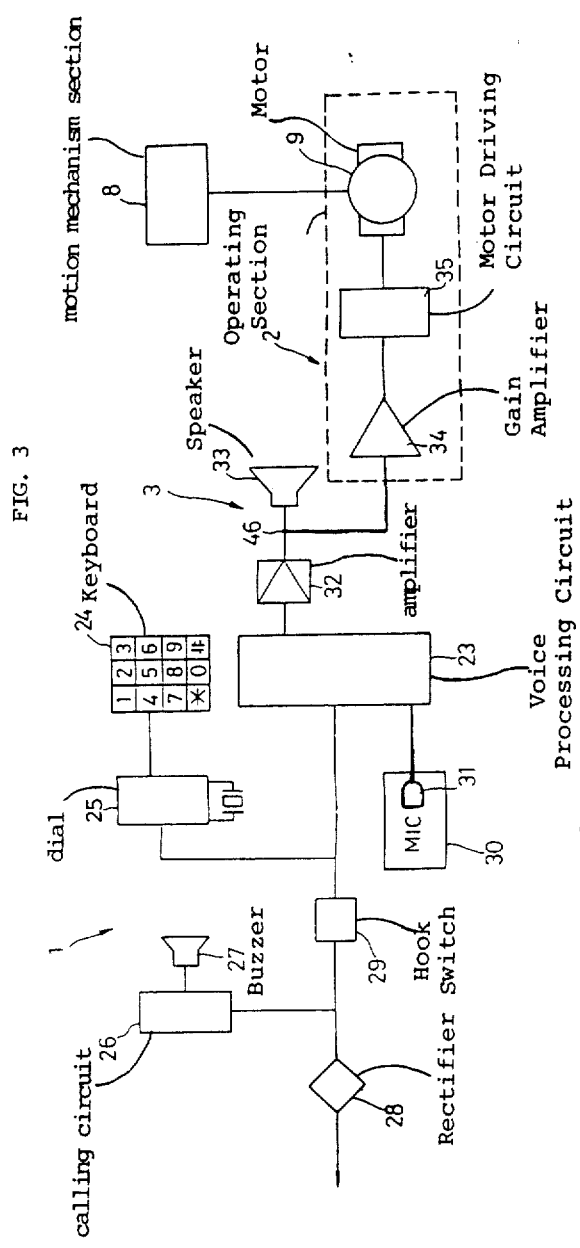
FIG. 3 is a block diagram of an embodiment of the present invention.

In the following description of the preferred embodiment of the present invention, like reference numerals identify elements having the same or similar function.

In the subject application, the terms calling party and user of the apparatus of the present invention are used to denote two possible parties to a conversation, regardless of which party initiated the conversation. That is, regardless of whether or not the user of the apparatus initiated the telephone conversation, the person at the other end of the coversation is referred to as the calling party.

FIG. 1 is a schematic diagram of a system embodying the present invention. In FIG. 1 reference numeral 1 identifies a telephone unit or telephonic means which transmits and receives telephone signals, for example on hook, off hook, speech signals and dial (pulse or tone) signals. Reference numeral 2 identifies an operating circuit which operates in response to one of the telephone signals received by the telephone unit. Reference numeral 3 identifies an announcing circuit or means which converts a speech signal received by the telephone unit 1 into sound so that a user of the apparatus can hear the speech of a calling party. Reference numeral 4 identifies a movable object which has movable elements such as eyes 6 and mouth 7. The movable elements move in synchronism with the speech of the calling party, and thus move in synchronism with the sound generated by the announcing circuit.

In operation, telephone signals are applied to a telephone line 5 which is connected to the telephone unit 1. Of the telephone signals, the telephone unit 1 converts speech signals, which correspond to the speech of a calling party, into a voice control signal which is then applied to the operating circuit 2 and to the announcing circuit 3. The operating circuit 2 actuates the movable object 4 in response to the voice control signal, and the announcing circuit produces sound responsive to the voice control signal.

FIG. 1 illustrates the movable object 4 as a teddy bear, but the movable object 4 can be any type of doll, stuffed toy or robot mechanism. The teddy bear or movable object 4 shown in FIG. 1 houses a motor and gear train mechanism such as illustrated in FIG. 2 so that the eyes 6 and mouth 7 move in synchronism with the speech of the calling party. Thus, to the user of the apparatus of the present invention, a conversation appears to be taking place with the teddy bear or movable object 4.

Referring to FIG. 2, each eye 6 comprises an eyeball 6a, and an eyelid 6b which is slidably mounted on the fixed eyeball 6a. Obviously, either one or both of these elements could be moved. The mouth 7 has an upper jaw 7a and a lower jaw 7b. The movable elements, or eyes 6 and mouth 7 in the illustrated embodiment, are moved by a motion section 8. The motion section 8 comprises a motor 9; a gear train mechanism 10 and linkage elements 18. The gear train mechanism 10 comprises a first gear 11 fixed to a rotation shaft of the motor 9; a second gear 12 having a larger diameter than the first gear 11 and positioned so as to engage the first gear 11; a third gear 13 rotatable with the second gear 12 and having a smaller diameter than the second gear 12; a fourth gear 14 having a larger diameter than the third gear 13 and positioned so as to engage the third gear 13; a fifth gear 15 having a smaller diameter than the fourth gear and rotatable with the fourth gear; and a sixth gear 16 having sector shape positioned so as to engage the fifth gear 15. The sixth gear 16 pivots about a pivot point 17.

The linkage elements 18 engage the tip portion of the sixth gear 16 as shown in FIG. 2. The linkage elements 18 comprise an oscillating lever 19 pivotably supported by a pivot 20a; a first link 21 connected to the oscillating lever 19; and a second link 22 connecting the first link 21 and the eyelid 6b. The oscillating lever 19 has formed therein elongated openings 23a and 23b. These openings respectively engage pins on the sixth gear 16 and the first link 21. The oscillating lever 19 has formed thereon a pivot which engages a slot 23c of the mouth 7. As the oscillating lever 19 pivots about a pivot point 20a, the upper jaw 7a pivots about a pivot point 20b and the eyelid 6b pivots about pivot point 20c. A limit switch 38 stops motion of the sixth gear 16 at the end of this gear's travel so as to preferably keep the sixth gear 16 engaged with the fifth gear 15.

Referring to FIG. 3, a telephonic unit or means 1 includes a voice processing circuit 23, a keyboard 24, a dial pulse generating circuit 25, a calling circuit 26, a buzzer 27, a rectifier 28 and a hook switch 29. In FIG. 3 and announcing section or means 3 includes the voice processing circuit 23, a microphone 30, amplifier 32 and a speaker 33 which generates sound in response to the output of the amplifier 32. In FIG. 3 the operating circuit 2 includes a gain amplifier 34 driven by the output of the amplifier 32, a motor driving circuit 35 and a motor 9.

Figure 4:
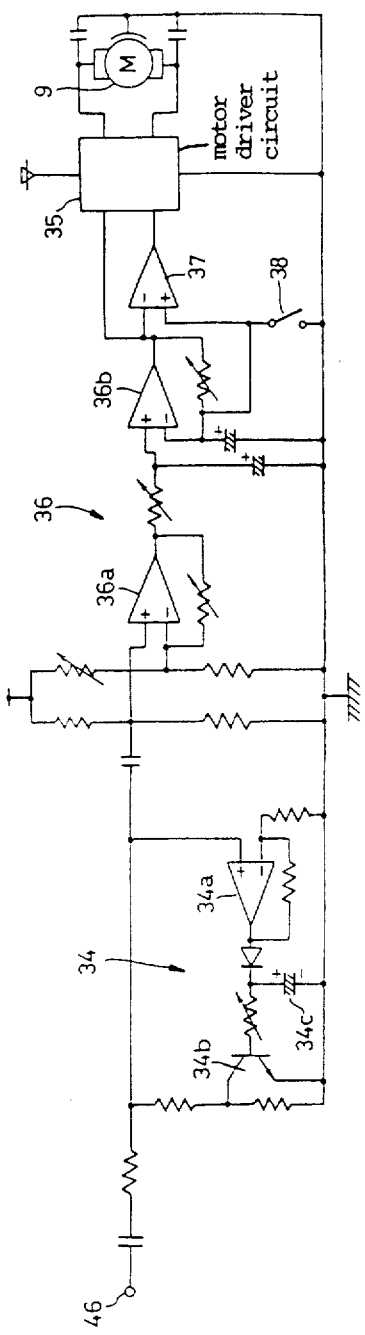
FIG. 4 is a schematic diagram of a portion of the embodiment illustrated in FIG. 3.

FIG. 4 is a schematic diagram of a portion of the embodiment of the operating circuit 3. As illustrated in In FIG. 4 the gain amplifier 34 can include an inverting amplifier 34a, transistor 34b, and the associated circuit components connected as shown in FIG. 4. FIG. 4 also illustrates a waveform shaping circuit 36 including operational amplifiers 36a and 36b, comparator 37, a limit switch 38 (as shown in FIG. 2). A terminal 46 shown in FIG. 4 corresponds to the terminal 46 shown in FIG. 3.

Figure 5:
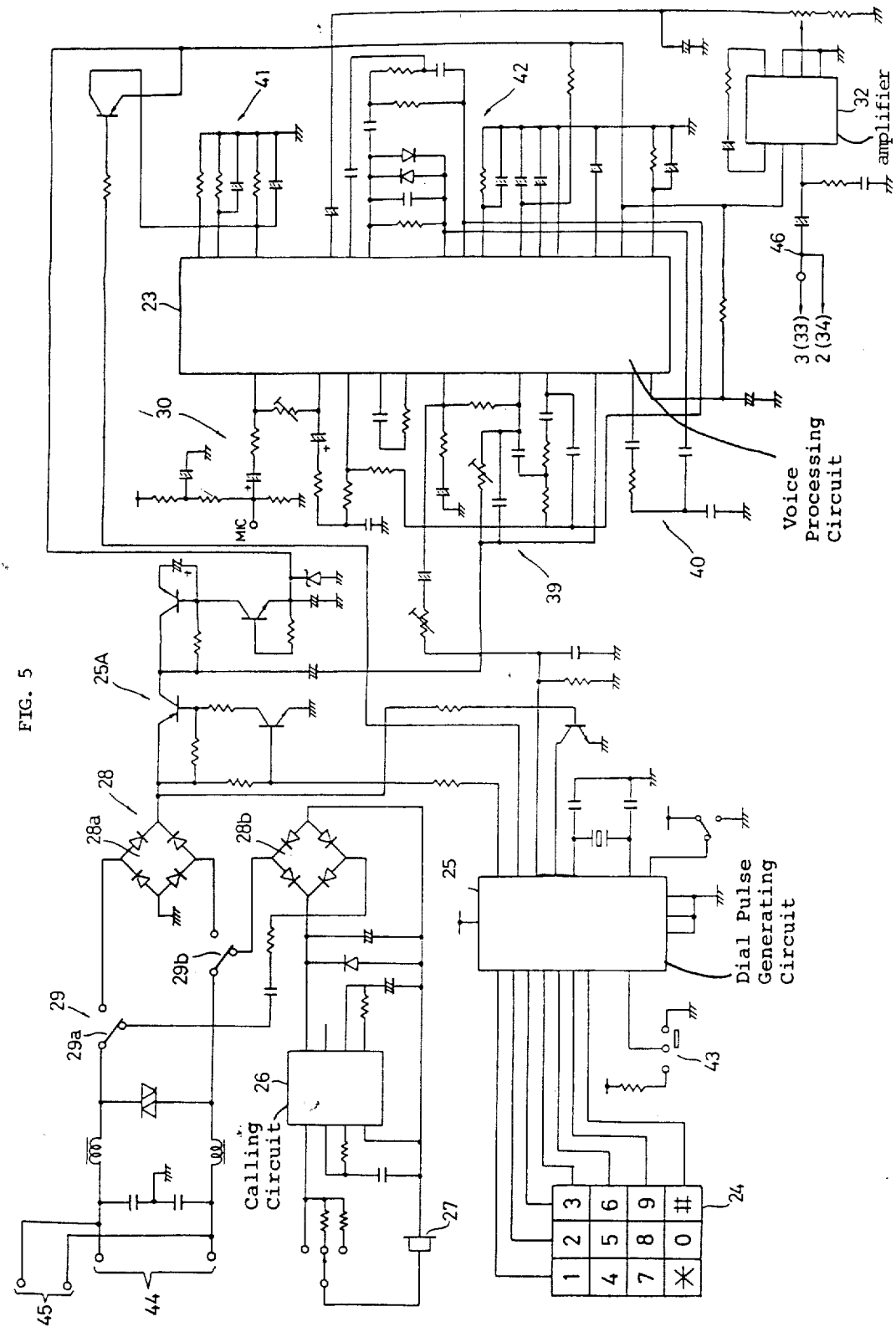
FIG. 5 is a schematic diagram of the remaining portion of the FIG. 3 embodiment.

Referring to FIG. 5, reference numeral 44 identifies a telephone line connecting terminal for connection to the telephone line 5 shown in FIG. 1, and numeral 45 denotes a connecting terminal for connection to another telephone line. The hook switch 29 shown in FIG. 5 includes hook switches 29a and 29b; and a rectifier 28 includes a first rectifier 28a and a second rectifier 28b. Reference numeral 25A denotes a dial pulse generating circuit, numeral 39 denotes a transmission signal amplifier for amplifying the signal to be transmitted, and the numeral 40 identifies a network circuit. Reference numeral 41 denotes a transmitting-receiving switching comparator which switches operation of the annunciator apparatus between transmitting and receiving. Reference numeral 42 identifies a receiving signal amplifier which amplifies a telephone signal received at terminals 44, and reference numeral 43 identifies a pulse/tone selection switch, which permits either dial pulses or tones to be applied to the line 5.

The operation of the annunciator apparatus having the above structure is described below. When telephone signals are applied on line 5 to the telephonic unit or means 1, the input signal current is rectified by rectifier 28 (FIG. 5) and then is input to the calling circuit 26 which causes the buzzer 27 to operate. When a user of the apparatus hears the buzzer 27, the user can, for example, speak a predetermined term into the microphone 30. This predetermined speech enables the voice processing circuit 23 to place the apparatus in an active state. By placing the telephone unit in an active state, the hook switch 29 operates hook switches 29a and 29b to connect the telephone line 5 to the calling circuit 26 through the second rectifier 28b. FIG. 5 shows the hook switch 29 positioned to connect the telephone line to the voice processing circuit 23 via the recitifier 28b. With this connection, a signal corresponding to the speech of a calling party received on telephone line 5 can be supplied to the voice processing circuit 23 via signal amplifier circuit 42. The voice processing circuit outputs a voice control signal to the amplifier 32, which then provides a voice control signal to the point 46 shown in FIGS. 3-5. The voice control signal drives the speaker 33 so that the user of the apparatus can hear the speech of the calling party. The voice control signal also drives the operating circuit 2.

Referring to FIGS. 3 and 5, when the user of the apparatus speaks into the microphone 30, the microphone generates a sound signal which is applied to the voice processing circuit 23. This causes the voice processing circuit 23 to transmit the sound signal to the telephone line 5 through the transmission signal amplifier 39. Therefore, when a sound signal is being applied to the voice processing circuit 23 via the microphone 30, this sound signal is not applied to either the speaker 33 or the operating section 2.

In the announcing circuit 3 shown in FIG. 3, the speaker 33 converts the voice control signal to sound so that the user of the apparatus can hear the calling party. As shown in FIGS. 1 and 3, the voice control signal is also applied to the operating circuit or means 2. Within the operating means 2, the amplifier 34 amplifies and shapes the voice control signal and applies the shaped signal to a motor driving circuit 35, which provides a motion control signal to control the motor 9. The motor 9 provides a rotative motion force for moving the motion mechanism 8 shown in FIG. 2. In the embodiment of the apparatus of the present invention shown in FIGS. 3-5, voice processing circuit 23 can comprise, for example, part number BA6571A manufactured by Rohm Co., dial pulse generating circuit 25 can comprise, for example, part number BU8302A manufactured by Rohm Co., calling circuit 26 can comprise, for example, part number BA6564A manufactured by Rohm Co., amplifier 32 can comprise, for example, part number BA546 manufactured by Rohm Co., and the motor driving circuit 35 can comprise, for example, part number LB1630 manufactured by Sanyo Co.

Whenever a voice control signal is supplied by the amplifier 32 to the gain amplifier 34, the motor drive circuit 35 causes the motor 9 to rotate. Referring to FIG. 2, rotation of the motor 9 causes the first gear 11 to rotate, causing the gear train mechanism 10 to rotate. The rotational direction of the motor 29 changes between forward and reverse in accordance with the presence or absence of the voice control signal 46. For example, when the calling party speaks, the voice control signal causes the sixth gear 16 to rotate in the direction of the arrow A1 shown in FIG. 2. This rotation is transmitted to the eyelid 6b through the links 21 and 22 causing the eyelid 6b to close. This motion also causes the upper jaw 7a and the lower 7b of the mouth 7 to open. When the calling party is not speaking, the sixth gear 16 rotates in the direction of an arrow A2 so as to open the eyelid 6a and to close the mouth 7. The above motions continue until the limit switch 38 is operated, causing the motor 9 to stop rotating. Because the voice control signal varys in synchronism with the speech of the calling party, the motions of the motion section 8 shown in FIG. 2 are performed in synchronism with the voice of the calling party. The movable object 4 or teddy bear shown in FIG. 2, therefore, appears to speak the words of the calling party as they are heard by the user of the apparatus from the speaker 33.

Those skilled in the art will recognize many variations of the apparatus of the present invention. The embodiment described above merely illustrates the apparatus of the present invention and is not intended to limit the scope of the present invention to the disclosed apparatus. Instead, the scope of the present invention is defined by the following claims.

What is claimed is:

1. An animated annunciator apparatus comprising:
   telephonic means for transmitting and receiving telephone signals including a speech signal;
   announcing means for receiving at least a first one of said telephone signals and for generating a voice control signal varying in accordance with said at least a first one of said telephone signals, and including
      means for converting the speech signal into said voice control signal and for generating sound in accordance with said voice control signal;
   animation means, having movable elements, for receiving said voice control signal and for moving said movable elements in synchronism with said voice control signal and synchronized with reception of said speech signal by said telephonic means, and including
      amplifier means for generating a motion control signal varying in accordance with said voice control signal;
      motor means for providing a motion force in a first direction and in a second direction in response to said motion control signal so that said movable elements move in synchronism with and track said speech signal;
      a gear train mechanism operatively connected to said motor means and being rotated by said motion force;
      linkage elements connected to said gear train mechanism and said movable elements so that said movable elements are selectively moved in the first direction and in the second direction by said gear train mechanism.

2. An animated annunciator apparatus according to claim 1, wherein said apparatus has an active state and an inactive state, and wherein said telephonic means includes:
   activation means for selectively placing said apparatus in said active state and said inactive state in response to at least a second one of said telephone signals; and
   means for receiving the speech signal and for transmitting dial signal signals.

3. An animated annunciator apparatus having an active state and an inactive state, comprising:
   activate means for receiving telephone signals including a speech signal and for selectively placing said apparatus in said active state and in said inactive state in response to at least one of said telephone signals;
   means for receiving said speech signal corresponding to one of said telephone signals and for transmitting dial signals;
   means for converting said speech signal into a voice control signal and for generating sound in accordance with said voice control signal;
   means for enabling said activate means to place said apparatus in said active state;
   amplifier means for generating a motion control signal varying in accordance with said voice control signal;
   movable element means, having movable elements, for providing animated movement in response to the motion control signal in synchronism with reception of said speech signal by said activate means;
   motor means for providing a motion force, in response to said motion control signal so that said movable elements move in synchronism with and track said speech signal;
   a gear train mechanism operatively connected to said motor means and rotated in response to said motion force; and
   linkage elements connected to said gear train mechanism and said movable elements so that said movable elements selectively move in a first direction and in a second direction in response to said motion control signal.

4. An animated annunciator apparatus comprising:
   telephonic means for transmitting and receiving telephone signals including a speech signal;
   announcing means for receiving said speech signal and for generating a voice control signal varying in accordance with said speech signal; and
   animation means, having movable elements, for receiving said voice control signal and for moving said movable elements in synchronism with said voice control signal and in synchronism with reception of said speech signal by said telephonic means, and including
      motor means for providing, in response to said voice control signal, a first rotative force in a first direction and a second rotative force in a second direction;
      a gear train mechanism operatively connected to said motor means and being rotated by said first rotative force and by said second rotative force;
      linkage elements connected to said gear train mechanism so that said movable elements selectively move in the first direction and in the second direction in response to said motion control signal and so that said movable elements move in synchronism with and track said speech signal.

* * * * *